(12) United States Patent
Mekanik et al.

(10) Patent No.: US 6,296,111 B1
(45) Date of Patent: Oct. 2, 2001

(54) MODULAR CONVEYOR BEAM ASSEMBLY

(75) Inventors: Mark E. Mekanik, Huddleston; Richard A. Smith; James F. Murphy, Jr., both of Lynchburg, all of VA (US)

(73) Assignee: Danville Automation Holdings, LLC, Lynchburg, VA (US)

( * ) Notice: Subject to any disclaimer, the term of this patent is extended or adjusted under 35 U.S.C. 154(b) by 0 days.

(21) Appl. No.: 09/261,517

(22) Filed: Mar. 3, 1999

(51) Int. Cl.$^7$ ..................................................... B65G 21/00
(52) U.S. Cl. ..................................... 198/860.1; 198/860.2; 198/836.3
(58) Field of Search ............................. 198/860.1, 860.2, 198/861.1, 836.1, 836.2, 836.3, 837, 842

(56) References Cited

U.S. PATENT DOCUMENTS

| | | | |
|---|---|---|---|
| 2,857,043 | * 10/1958 | Eden ............................. | 198/860.2 X |
| 3,800,938 | * 4/1974 | Stone . | |
| 4,146,126 | * 3/1979 | Mattos . | |
| 4,390,091 | * 6/1983 | Gonzalez . | |
| 4,934,516 | * 6/1990 | Dugan ......................... | 198/861.1 X |
| 4,961,492 | * 10/1990 | Wiseman et al. . | |
| 5,082,108 | * 1/1992 | Douglas . | |
| 5,131,531 | * 7/1992 | Chambers . | |
| 5,178,263 | * 1/1993 | Kempen . | |
| 5,316,134 | * 5/1994 | Donohue . | |
| 5,322,160 | * 6/1994 | Markiewicz et al. . | |
| 5,676,239 | * 10/1997 | Mason . | |
| 5,782,339 | * 7/1998 | Drewitz . | |
| 5,797,481 | * 8/1998 | Uber et al. . | |

\* cited by examiner

*Primary Examiner*—James R. Bidwell
(74) *Attorney, Agent, or Firm*—St. Onge Steward Johnston & Reens LLC

(57) ABSTRACT

A modular conveyor beam assembly is disclosed using readily removable stock components comprising a conveyor beam having an upper surface; a plurality of brackets mounted on the upper surface; a wearstrip mounted to the plurality of brackets; an endless chain having a conveying portion and a return portion, the conveying portion supported by the wearstrip; a plurality of support segments to receive the return portion of the endless chain; and an apex formed in the upper surface of the conveyor beam to drain the conveyor beam after washing.

In a preferred embodiment, the modular conveyor beam assembly further comprises a first member contained in at least one bracket for mounting a guide rail section and a first mount element wherein a position of the guide rail section is adjustable, and wherein the support segments join substantially flat, planar side surfaces of the conveyor beam and are freely removable.

15 Claims, 4 Drawing Sheets

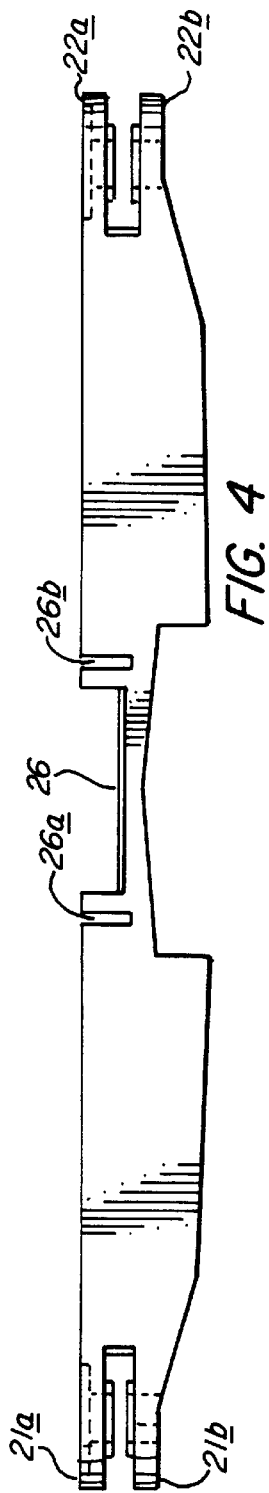
FIG. 4
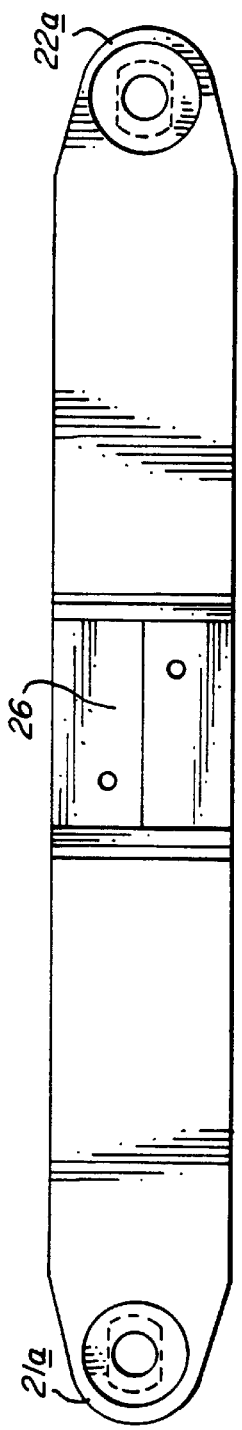
FIG. 5
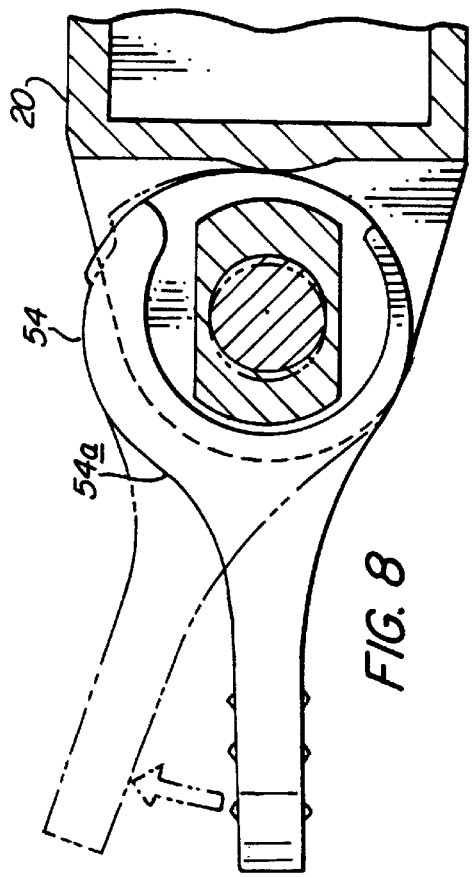
FIG. 8
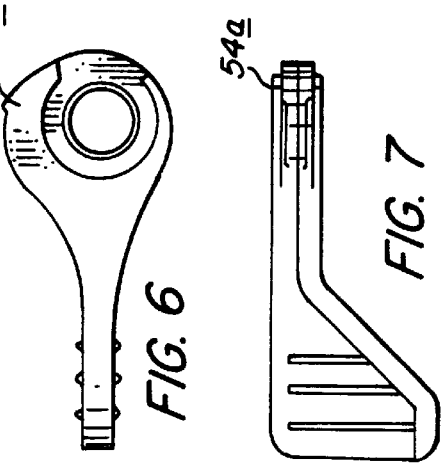
FIG. 6
FIG. 7

MODULAR CONVEYOR BEAM ASSEMBLY

FIELD OF THE INVENTION

The present invention relates to modular conveyor systems that can be conveniently assembled into a variety of configurations. More specifically a modular conveyor beam assembly is provided that can be fitted together using removable stock components of uniform structure allowing simpler assembly, disassembly, adjustment and easier cleaning of the conveyor unit.

BACKGROUND OF THE INVENTION

Modular conveyor systems using standardized uniform stock components normally of extruded material are well known in the art. Modular conveyor systems have an advantage in that they can be assembled in the field whereas customized systems are typically factory assembled and shipped to the operating site. In addition, use of standardized modular components allows a conveyor system to be designed for a particular layout without having to custom design special components such as conveyor beams, side rails, chains, fasteners and bracketry. However such prior art modular conveyor systems still require some labor intensive steps for assembly such as, for example, bolting the side rails to the conveyor beam along longitudinally extending "T-slots" in the beam. The use of such construction increases cost, complexity of manufacturing and installation. An additional problem with modular conveyors of such conventional construction is the tendency for foreign material to accumulate in various slots and interfaces associated with the fittings and surfaces to receive the standardized components. Consequently, washdown of such conveyor systems can be problematic, particularly for the food industry.

For example, U.S. Pat. No. 3,800,938 (Stone) discloses a conveyor assembly comprising an elongated pair of oppositely disposed extrusions forming a pair of "T slots" or channels. Part of the extruded frame is inclined to allow contaminants to roll off the beam, thus providing a form of self-cleaning. However, an extruded frame assembly with such T slots is more costly to manufacture and has the problem of greater accumulation of debris on the conveyor assembly due to the formed channels or grooves. Moreover such grooves pose alignment problems and are subject to imperfections and damage such as bending.

U.S. Pat. No. 4,146,126 (Mattos) discloses a modular conveyor using a plurality of pedestals arranged along a single line removably connected to a plurality of aligned beams. Although the conveyor can be adjusted to open the belt for interior cleaning, the unit comprises a more complex design involving at least two idler rollers and a subframe pivoted between side rails. Such an assembly is costly to manufacture and maintain and requires more bolting and brackets to achieve a modular assembly.

U.S. Pat. No. 4,961,492 (Wiseman, et al.) teaches the use of an "H-shaped" core beam member wherein the beam also has at least four extruded channels running the length of the beam. The disclosed conveyor allows the chain to be relatively freely removed from the H beam to facilitate maintenance and cleaning. However, the H beam can be more costly to manufacture and assemble, and there is no provision for mounting article guide rails in a modular fashion that is integral to the design of the conveyor assembly as disclosed.

U.S. Pat. No. 5,082,108 (Douglas) teaches a modular conveyor beam with a plurality of cross members with tongue and groove combinations on opposing lateral sides, as well as a pair of opposing side guides with such a tongue and groove combination. The side guides must fit in a tongue and groove channel formed along the entire length of the beam assembly thereby increasing the cost of extruding the beam member and side rail.

U.S. Pat. No. 5,178,263 (Kempen) teaches the use of a modular track unit using a horizontal "I shape" beam. As with the other prior art, each side of the track includes a longitudinal slot running the length of the beam. In addition to the other disadvantages mentioned in the previous patents, such a subunit does not readily allow for the use of curves in the conveyor assembly as the function of the side stiffening rail is to promote further support of the guide beam assembly. Moreover, the conveyor assembly requires numerous bolted connections and provides no means to easily adjust the position of guide rails to accommodate various sized articles for conveying.

U.S. Pat. No. 5,316,134 (Donohue) discloses an elongated frame made up of a number of extruded guide track segments, including a pair of vertical side walls extending top to bottom along the entire length of the beam assembly. Such a design still allows increased opportunity for foreign matter and debris to accumulate due to numerous extruded guide track segments. This renders cleaning more difficult and manufacturing more costly due to the extra material and tolerances associated with forming numerous guide track segments. In addition, as with the Kempen patent, the conveyor assembly is not designed to easily adjust the position of guide rails to accommodate various sized articles for conveying as the rails are bolted to brackets, which in turn are bolted to the side walls of the elongated frame.

A disadvantage to the prior art is that previous designs of modular conveyor assemblies either employ a design that is more costly and complex, or are not of a construction that allows for ease of assembly and cleaning. What is desired, therefore, is a modular conveyor beam assembly that is less costly to manufacture, easier to assemble, configure and dismantle, and is of a design that facilitates cleaner operation by using less exposed surfaces.

SUMMARY OF THE INVENTION

Accordingly it is an object of the present invention to provide a modular conveyor beam assembly which uses a minimum number of structural members of a uniform and modular design thereby facilitating quick assembly, configuration and dismantling of the conveyor beam assembly while reducing its manufacturing cost.

It is another object of the present invention to provide modular conveyor beam assembly that minimizes the use of edges and channels wherein foreign matter and debris can accumulate.

It is a further object of the present invention to provide a modular conveyor assembly with substantially flat, planar and angled surfaces in order to reduce contact of any foreign matter and debris with the conveyed articles.

Another object of the present invention is to provide a modular conveyor beam assembly that minimizes the use of connection or fastening points between each modular structural unit thereby facilitating quick assembly, configuration to an operating site, and dismantling.

Yet another object of the present invention is to provide a modular conveyor beam assembly with connection and fastening points that are freely removable without the use of additional tools or instruments.

A further object of the invention is to provide modular conveyor beam assembly with wearstrips that can be readily removed and replaced, and are configured to reduce uneven wear of an endless chain.

Another object of the invention is to provide modular conveyor beam assembly with guide rail sections that can be easily adjusted to suit various sized articles to be conveyed.

Still another object of the invention is to provide modular conveyor beam assembly with a channel that allows an endless chain to be lifted to facilitate cleaning of the assembly.

To overcome the deficiency of the prior art and to achieve at least some of the objects and advantages listed above, the present invention comprises: a conveyor beam having an upper surface; a plurality of brackets mounted on the conveyor beam; a wearstrip mounted to the brackets; an endless chain having a conveying portion and a return portion, the conveying portion supported by the wearstrip; a plurality of support segments to receive the return portion of the endless chain; and an apex formed in the upper surface of the conveyor beam to drain the conveyor beam after washing. Preferably, the brackets have wearstrips mounted in the bracket and a channel to allow the endless chain to be lifted out therefrom to facilitate maintenance and/or cleaning.

The invention in one of its aspects also provides a conveyor beam section wherein the support segments join the side surfaces of the conveyor beam; the support segments being freely removable from the side surfaces of the conveyor beam.

In another embodiment, the invention provides a return wearstrip which supports the return portion of the endless chain wherein the return wearstrip forms a path along a length of the modular conveyor assembly so as to reduce scoring or uneven wear of the endless chain. Preferably, the support segments have a channel that mounts the return wearstrip and allows the return wearstrip to be freely removable from the support segments.

In another aspect, the modular conveyor beam assembly further comprises a first and second member for mounting a guide rail section, the first and second member having a first and second mount element, wherein the position of the guide rail section is adjustable via the first and second mount elements. Preferably, the guide rail section has a guide rail wearstrip, wherein the guide rail section has an edge that allows the guide rail wearstrip to be freely removable.

The invention and its particular features and advantages will become more apparent from the following detailed description when considered with reference to the accompanying drawings.

BRIEF DESCRIPTION OF THE DRAWINGS

FIG. 4 and FIG. 5 show a side elevation view and top view, respectively, of the bracket as shown in FIG. 3.

FIG. 6 and FIG. 7 show a top view and side elevation view, respectively, of the key clip 54a as shown in FIG. 3.

FIG. 8 is a sectional top view of the key clip 54a and a portion of the bracket taken along section line B—B of FIG. 3.

DETAILED DESCRIPTION OF THE INVENTION

Figure 1:
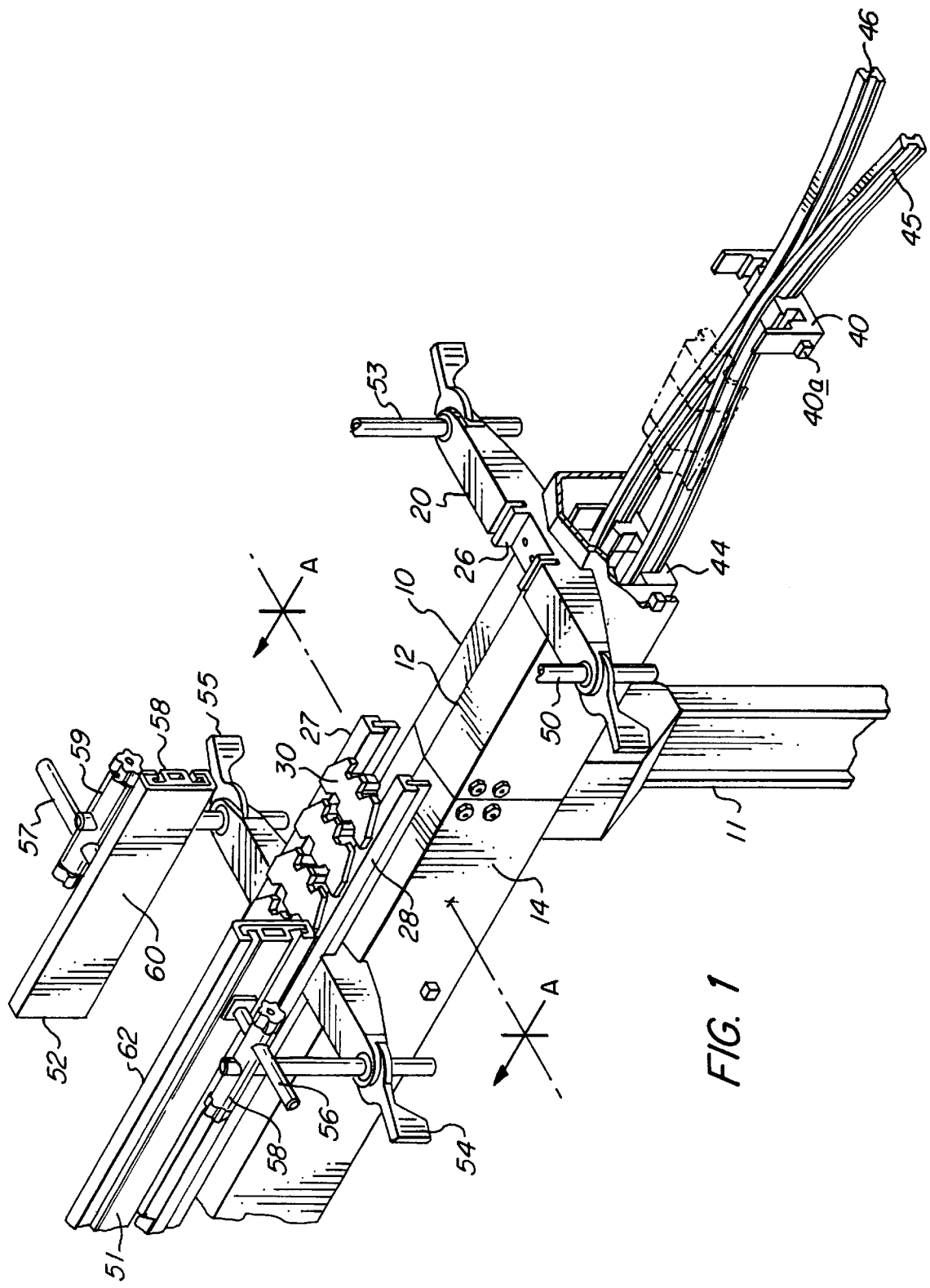
FIG. 1 is a partial perspective view, partially cut away of the modular conveyor assembly in accordance with the invention.
Figure 2:
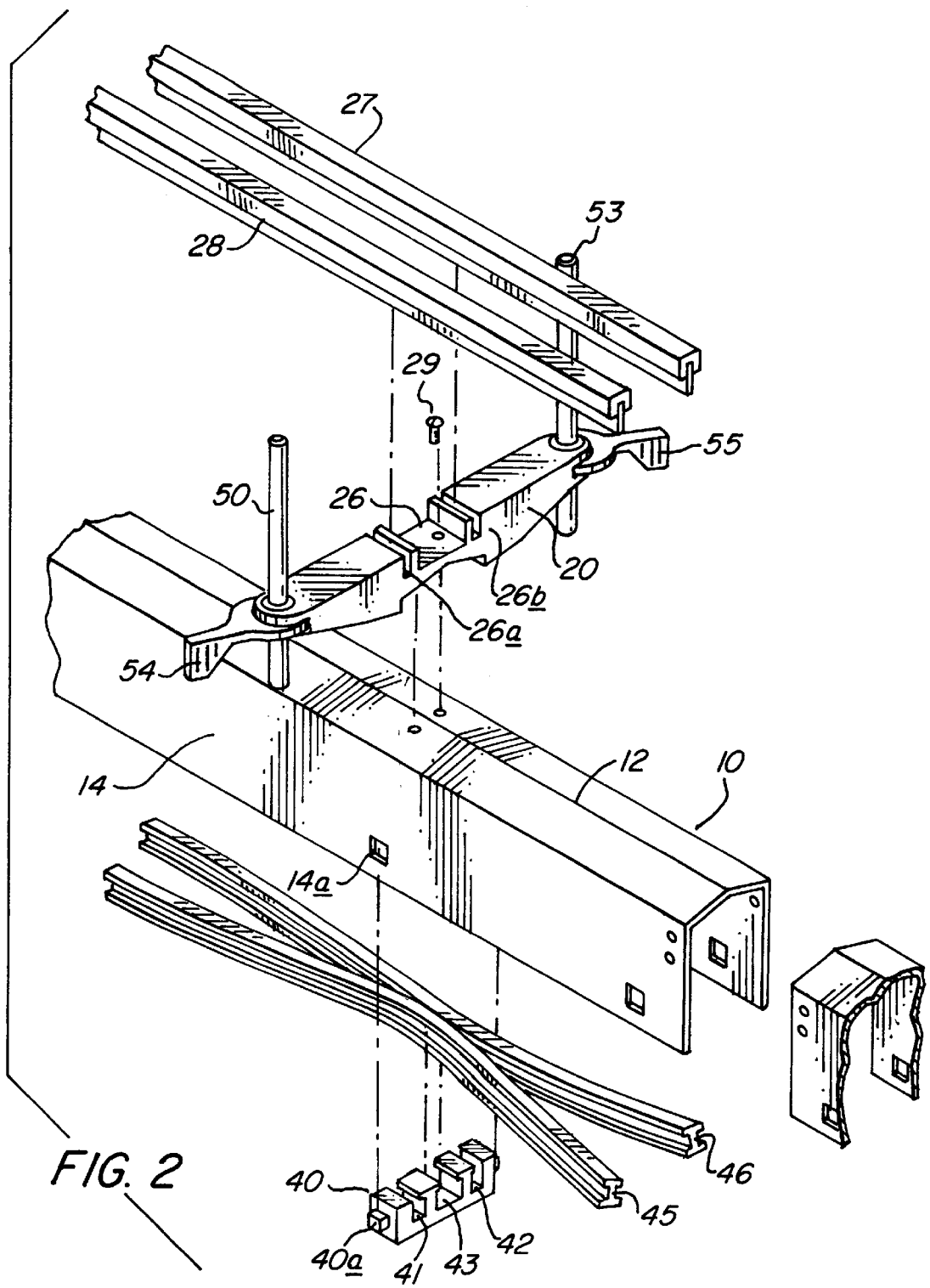
FIG. 2 is an exploded perspective view showing the fit between some of the structural elements of the modular conveyor beam assembly.
Figure 3:
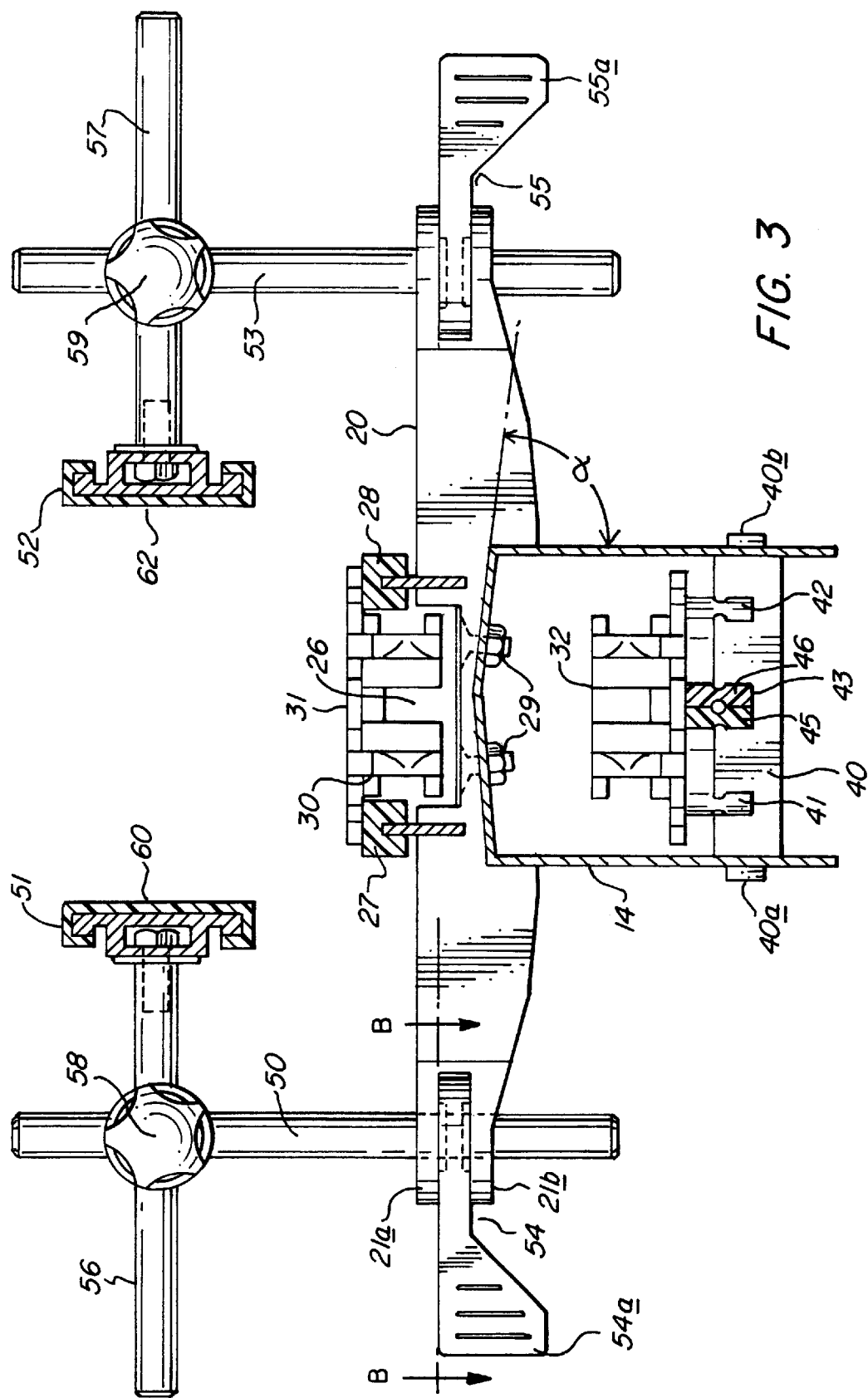
FIG. 3 is a sectional view taken along section line A—A of the modular conveyor beam assembly as shown in FIG. 1.

Referring to FIGS. 1 through 3, the basic elements of the modular conveyor beam assembly are illustrated. It should be noted for the sake of clarity all the components and parts of the modular conveyor beam assembly may not be shown and/or marked in all the drawings. As used in this description, the terms "upper", "lower", "up", "down", "top", "bottom", etc. refer to the modular conveyor beam assembly when in the orientation illustrated in FIG. 1. A conveyor beam 10 is shown having an upper surface with an apex 12 and a side surface 14.

One embodiment of the conveyor beam 10 is illustrated in FIG. 2, wherein the conveyor beam 10 is formed of a single piece of material, such as sheet metal, that may be readily extruded or bent. The conveyor beam 10 can be joined together with other sections of the same structure through bolting, screws, or any other means known in the art. The conveyor beam 10 defines said upper surface with an apex 12 so as to form an angle to a vertical plane $\alpha$ that facilitates the removal of foreign material and debris from the upper surface, wherein the side sections 14 of the conveyor beam 10 are joined by the upper surface 12 thereby creating the conveyor beam 10 as for example, but not by limitation, a three sided beam member. Preferably, the side sections 14 are substantially vertical, thereby facilitating drainage of conveyor beam 10 after washing.

One advantage to the conveyor beam 10 of the present invention is that it allows for "self cleaning" in that it is of a sloped design that reduces the accumulation of foreign material or debris and allows drainage of the beam after washing. This is accomplished while reducing the amount of structural material and/or manufacturing steps to form the conveyor beam 10. Therefore it achieves the desired function of facilitating cleaning at a reduced cost and complexity.

Preferably, particularly for food operations, the conveyor beam 10 is made of stainless steel material such as 14 gauge 304 SS. Referring to FIG. 3, the angle $\alpha$ forming the upper surface with the apex 12 is not limited to any particular value, however, an angle of 85 degrees to the vertical plane is operable and can allow for material, such as dirt or debris, to fall therefrom by gravity and/or by washing the conveyor beam 10 in place.

A bracket 20 is preferably constructed in a wholly separate modular piece apart from the conveyor beam 10. The bracket 20 may be formed from an extruded or molded material with sufficient rigidity for the application, such as extruded or molded high density plastic or metal, or may be of stamped metal, or any other material suitable for the application. Preferably, the bracket 20 is formed to define a channel 26 to receive an endless chain 30 having a conveying portion 31 and a return portion 32. The bracket 20 is further formed to receive wearstrips 27 and 28 and can be attached to conveyor beam section 10 through a cut out section that mates with the upper surface with an apex 12 and at least part of the side surface 14.

One advantage of such a cut out section is that the bracket 20 can be securely mounted to the conveyor beam 10 with a minimal number of fasteners, such as for example, fastener bolts 29. This allows for easier set-up and breakdown, and makes the modular conveyor beam assembly of the present invention better suited to accommodate changing layouts that require additions or removal of modular sections.

Another advantage to the bracket 20 of the present invention is that it eliminates unnecessary channels or grooves present in prior modular conveyor beams used to support a side section or guide rail. This allows the conveyor beam 10 to be formed of a simpler, less costly design that uses more substantially planar surfaces, unlike the prior art designs that employed numerous extruded channels and exterior support rails that required more bolting and close fitting within the precisely extruded channels. Consequently, the modular conveyor beam assembly of the present invention is cheaper to manufacture, easier to set-up, breakdown and clean.

In one embodiment, the bracket 20 has grooves 26a and 26b as shown in FIG. 2 to receive the wearstrips 27 and 28. The thickness of the grooves 26a and 26b are of a space in bracket 20 to enable wearstrips 27 and 28 to be relatively freely removable therefrom. What is generally meant by "freely removable" is that removal can be accomplished without the need of separate instruments or tools, such as by lifting or sliding out, thereby aiding in replacement, set-up, breakdown and cleaning of the conveyor assembly. Preferably, the bracket 20 is configured with the wearstrips 27 and 28 to support the endless chain 30 while still allowing the endless chain 30 to be lifted out of the bracket 20 to facilitate cleaning such as disclosed in U.S. Pat. No. 4,961,492 (Wiseman, et al.), hereby incorporated by reference.

In addition, bracket 20 can be formed to mount a guide rail section 51 and 52. The bracket 20 can be bored on each respective end to accommodate a first member 50 and 53 for mounting a guide rail section 51 and 52. Referring to FIG. 3, the bracket 20 can contain a first mount element 54 and/or 55 which allows the position of the guide rail sections 51 and/or 52 relative to the conveying portion 31 to be adjusted and locked via the first mount element 54 and/or 55. By way of example, and not as a limitation to the present invention, the first mount elements 54 and 55 can comprise key clips 54a and 55a that hold first members 50 and 53 in the bores formed from bracket 20.

Also by way of example and not as a limitation to the present invention, and as shown in FIGS. 4–8, each key clip can fit as key clip 54a fits between ears 21a and 21b formed from bracket 20. Each of the ears 21a and 21b has raised flanges 22a and 22b that accommodate a recess on each side of key clip 54a so that when key clip 54a is turned, it forces member 50 against the bore in bracket 20 thereby holding member 50 in a chosen position within bracket 20.

The bracket 20 can further contain a second member 56 and/or 57 which allows the position of the guide rail sections 51 and 52 relative to the conveying portion 31 to be adjustable. The second member 56 contains a second mount element 58. Similarly, second member 57 can also contain a second mount element 59. The second mount elements 58 and 59 can respectively link the second members 56 and 57 to first members 50 and 53. The second mount elements 58 and 59 also allow adjustment and locking of second members 56 and 57, respectively, without any additional tools or instruments, such as by hand tightened set bolts, or any other means known in the art.

FIGS. 1 and 3 show one embodiment of the first and second mount elements 58 and 59 wherein the position of the second members 56 and 57 can be adjusted and locked via a hand screw element. The present invention is not limited to the previously described embodiments of the first mount elements 54 and 55, or the second mount elements 58 and 59, but may be of any type that allows an operator to adjust the position of a guide rail section of a modular conveyor system, such as guide rail sections 51 and 52, with identical modular pieces of uniform construction without requiring the operator to use additional instruments or tools to do so.

The side surface 14 of the conveyor beam 10 can further contain the ability to receive a support element such as support segments 40 and 44. As with all the modular elements of the present invention, support segment 40 is same in structure to support segment 44. Support segment 40 receives the return portion 32 of the endless chain 30. By way of example, and not as a limitation to the present invention, the side surfaces 14 of the conveyor beam 10 can contain notches that receive support fasteners 40a and 40b from support segment 40. The support fasteners 40a and 40b being removable from the conveyor beam section 10 without the need of additional tools or instruments and can be of any means known in the art such as, and not by limitation, snap fits, interference fittings, hooks, tongue and groove, etc. An advantage to such support segments 40 and 44 is that they can be joined to the side surfaces 14 of conveyor beam 10 without independent fasteners such as bolts, screws or rivets and the like.

Support segments 40 and 44 can be also of a material having a sufficient stiffness yet flexibility to allow relatively free removal from side surface 14, such as through a snap fitting or any other means known in the art. Such a material can be a high density plastic or suitable metal known to those skilled in the art. Alternatively, the material and shape of side surface 14 of conveyor beam 10 can be of a material of sufficient flexibility that allows relatively free removal of support segments 40 and 44, such as through a snap fitting, or any other means known in the art.

In a preferred embodiment, support segments 40 and 44 form first and second lower channels 41 and 42, respectively, and a third lower channel 43, to accommodate first and second return wearstrips 45 and 46 respectively. Preferably, the first and second return wearstrips 45 and 46 are configured within the first, second and third lower channels 41, 42 and 43 such that the first and second return wearstrips 45 and 46 are spaced closer together within the third lower channel 43 of support segment 40 relative to the spacing of the return wearstrips 45 and 46 within the first and second lower channels 41 and 42 of support segment 44 such that the return wearstrips 45 and 46 form a path along a length of the modular conveyor assembly so as to reduce uneven wear of endless chain 30, as shown in FIGS. 1 and 2 by example and not by limitation to the present invention. Such a path allows uniform wear and prevents localized scoring of the conveying portion 31 of the endless chain 30 as disclosed in U.S. Pat. No. 5,082,108 (Douglas), hereby incorporated by reference. The wearstrips 27, 28, and return wearstrips 45 and 46 are preferably of a high density plastic, such as ultra high molecular weight polyethylene (UHMW-PE), that provides good wear properties with minimal frictional resistance to the surfaces of the endless chain 30.

It is also preferred that guide rail sections 51 and 52 respectively contain a first guide rail wearstrip 60 and a second guide rail wearstrip 62, wherein the guide rail wearstrips form a continuous smooth and flat surface that facilitates cleaning and reduces friction between an article conveyed along the conveying portion 31. Preferably, the guide rail wearstrips 60 and 62 are formed to be respectively mounted to guide rails 51 and 52 without the need of any independent fasteners such as screws or bolts, thereby facilitating their installation and removal for replacement and cleaning. This can be accomplished, for example, and not as a limitation to the present invention, by forming the guide rail wearstrips from a flexible material such as UHMW-PE and forming the guide rail wearstrips 60 and 62 so that they can be snap fitted or slided over an edge of guide rails 51 and 52.

It should be understood that the foregoing is illustrative and not limiting and that obvious modifications may be made by those skilled in the art without departing from the spirit of the invention. Accordingly, reference should be made primarily to the accompanying claims, rather than the foregoing specification, to determine the scope of the invention.

What is claimed is:

1. A modular conveyor assembly comprising:
   a conveyor beam having an upper surface;
   a plurality of brackets mounted in a spaced apart fashion on the upper surface of said conveyor beam;
   a wearstrip mounted to said plurality of brackets;
   an endless chain having a conveying portion and a return portion, the conveying portion of said endless chain supported by said wearstrip;
   a plurality of support segments to receive the return portion of said endless chain; and
   an apex formed in the upper surface of said conveyor beam to drain said conveyor beam after washing.

2. A modular conveyor assembly as claimed in claim 1, wherein said conveyor beam has substantially planar side surfaces and said plurality of support segments joins the side surfaces of said conveyor beam; said support segments being freely removable from the side surfaces of said conveyor beam.

3. A modular conveyor assembly as claimed in claim 2, wherein the side surfaces of said conveyor beam are substantially vertical.

4. A modular conveyor assembly as claimed in claim 2, wherein said support segments join the side surfaces of said conveyor beam without independent fasteners.

5. A modular conveyor assembly as claimed in claim 2, wherein said support segments join the side surfaces of said conveyor beam via a snap fit.

6. A modular conveyor assembly as claimed in claim 2, wherein said support segments join the side surfaces of said conveyor beam via an interference fit.

7. A modular conveyor assembly comprising:
   a conveyor beam having an upper surface;
   a plurality of brackets mounted in a spaced apart fashion on the upper surface of said conveyor beam;
   a wearstrip mounted to said plurality of brackets;
   an endless chain having a conveying portion and a return portion, the conveying portion of said endless chain supported by said wearstrip;
   a plurality of support segments to receive the return portion of said endless chain;
   a return wearstrip to receive the return portion of said endless chain; said return wearstrip mounted to said support segments; and
   an apex formed in the upper surface of said conveyor beam to drain said conveyor beam after washing.

8. A modular conveyor assembly as claimed in claim 7, wherein said return wearstrip forms a path along a length of the modular conveyor assembly so as to reduce uneven wear of said endless chain.

9. A modular conveyor assembly as claimed in claim 7, wherein said brackets have a channel to allow said endless chain to be lifted out therefrom.

10. A modular conveyor assembly as claimed in claim 7, wherein said return wearstrip supports the return portion of said endless chain.

11. A modular conveyor assembly as claimed in claim 7, wherein said brackets have a groove to allow said wearstrip to be freely removable from said bracket.

12. A modular conveyor assembly as claimed in claim 7, wherein said support segments have a channel to allow said return wearstrip to be freely removable from said support segments.

13. A modular conveyor assembly comprising:
    a conveyor beam having an upper surface;
    a plurality of brackets mounted in a spaced apart fashion on the upper surface of said conveyor beam;
    a wearstrip mounted to said plurality of brackets;
    an endless chain having a conveying portion and a return portion, the conveying portion of said endless chain supported by said wearstrip;
    a plurality of support segments to receive the return portion of said endless chain;
    an apex formed in the upper surface of said conveyor beam to drain said conveyor beam after washing;
    a first member for mounting a guide rail section wherein at least one of said plurality of brackets contains said first member; and
    a first mount element; said first mount element containing said first member wherein a position of the guide rail section relative to the conveying portion of said endless chain is adjustable via said first mount element.

14. A modular conveyor assembly as claimed in claim 13, having a second member for mounting the guide rail section; and
    a second mount element; said second member linked to said first member; said second mount element containing said second member wherein a position of the guide rail section relative to the conveying portion of said endless chain is adjustable via said second mount element.

15. A modular conveyor assembly as claimed in claim 14, having a guide rail section; said guide rail section mounted to said second member; and
    a guide rail wearstrip; said guide rail wearstrip mounted to an edge of said guide rail section, wherein the edge of said guide rail section allows said guide rail wearstrip to be freely removable from said guide rail section.

* * * * *